(12) United States Patent
Oka

(10) Patent No.: US 12,117,615 B2
(45) Date of Patent: Oct. 15, 2024

(54) HEAD-MOUNTED DISPLAY

(71) Applicant: JVCKENWOOD Corporation, Yokohama (JP)

(72) Inventor: Hisashi Oka, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 267 days.

(21) Appl. No.: 17/472,482

(22) Filed: Sep. 10, 2021

(65) Prior Publication Data

US 2021/0405376 A1 Dec. 30, 2021

Related U.S. Application Data

(63) Continuation of application No. PCT/JP2020/015631, filed on Apr. 7, 2020.

(30) Foreign Application Priority Data

Apr. 19, 2019 (JP) ................. 2019-079764

(51) Int. Cl.
*H04N 13/344* (2018.01)
*G02B 27/01* (2006.01)
*G06F 3/01* (2006.01)

(52) U.S. Cl.
CPC ....... *G02B 27/0172* (2013.01); *H04N 13/344* (2018.05); *G02B 2027/0187* (2013.01); *G06F 3/013* (2013.01)

(58) Field of Classification Search
CPC ........ G02B 27/10; G02B 27/26; G02B 27/01; G02B 5/30; G02B 2027/0187; G02B 27/0172; H04N 13/04; H04N 13/344; G06F 3/013
See application file for complete search history.

(56) References Cited

U.S. PATENT DOCUMENTS

| 5,949,388 A | 9/1999 | Atsumi et al. |
| 5,982,343 A | 11/1999 | Iba et al. |
| 2002/0191073 A1 | 12/2002 | Satoh |
| 2015/0085088 A1* | 3/2015 | Asai ............... H04N 13/317 348/54 |
| 2019/0285905 A1* | 9/2019 | Tam ................ G02B 17/004 |

(Continued)

FOREIGN PATENT DOCUMENTS

| JP | H07043634 A | 2/1995 |
| JP | H07274097 A | 10/1995 |
| JP | H08251510 A | 9/1996 |

(Continued)

*Primary Examiner* — Michael A Faragalla

(74) *Attorney, Agent, or Firm* — Procopio, Cory, Hargreaves & Savitch LLP

(57) ABSTRACT

A head-mounted display according to this embodiment includes a left-eye optical system configured to focus display light of a left-eye image from a display element unit on a left eye of a user wearing a head-mounted display, a right-eye optical system placed bilaterally symmetrically to the left-eye optical system and configured to focus display light of a right-eye image from the display element unit on a right eye of the user, and a viewing angle control sheet configured to restrict a spread angle of display light from the display element unit in a left-right direction, and the viewing angle control sheet is fixed to a display surface of the display element unit.

2 Claims, 16 Drawing Sheets

(56) References Cited

U.S. PATENT DOCUMENTS

2019/0377177 A1\* 12/2019 Takahashi .............. G02B 30/28

FOREIGN PATENT DOCUMENTS

| JP | H10206786 A | 8/1998 |
| JP | 2002196281 A | 7/2002 |
| JP | 2006201611 A | 8/2006 |
| JP | 2013068856 A | 4/2013 |
| JP | 2015084079 A | 4/2015 |

\* cited by examiner

HEAD-MOUNTED DISPLAY

CROSS REFERENCE TO RELATED APPLICATION

This present application is a Bypass Continuation of PCT/JP2020/015631 filed on Apr. 7, 2020, which is based upon and claims the benefit of priority from Japanese patent application No. 2019-079764 filed on Apr. 19, 2019, the disclosure of which is incorporated herein in its entirety by reference.

BACKGROUND

The present invention relates to a head-mounted display.

Patent Literature 1 (Japanese Unexamined Patent Application Publication No. H8-251510) discloses a head-mounted display device including a backlight, an LCD, a half mirror, a concave mirror, and an eyepiece window (FIG. 1). Display light from the LCD is reflected forward by the half mirror and enters the concave mirror. The display light reflected by the concave mirror enters the eyeball through the half mirror and the eyepiece window.

Patent Literature 2 (Japanese Unexamined Patent Application Publication No. 2002-196281) discloses an image separation device for viewing a 3D image with no crosstalk. In the image separation device disclosed in Patent Literature 2, left- and right-eye images are incident on the left and right eyes independently of each other. To be specific, the image separation device includes a liquid crystal display element, two polarizing plates, and two ½ wave plates. The two ½ wave plates are placed in one of two areas of an image display surface divided into left and right halves.

Patent Literature 3 (Japanese Unexamined Patent Application Publication No. H7-43634) discloses a head-mounted display including a liquid crystal panel and an ocular optical system. The head-mounted display has a see-through function. The head-mounted display includes a half mirror prism and a concave mirror. Light from the liquid crystal panel passes through the half mirror prism and enters the concave mirror. The light reflected by the concave mirror is reflected by the half mirror prism and enters the eyeball. An optical element for attenuating unwanted outside light is placed on the upper and lower end surfaces of a half mirror on the image optical path. The optical element is a λ/4 plate, a visual field selection glass, a light absorption filter, a wavelength filter, or a polarizing element. Further, a louver optical element is placed on the front surface of the half mirror prism.

SUMMARY

As described above, the head-mounted display is provided with an optical system for guiding display light from a display element to each of left and right eyes. For example, the head-mounted display includes a left-eye display element, a left-eye optical system, a right-eye display element, and a right-eye optical system.

However, the head-mounted display has a problem that a noise component called crosstalk light where display light from the right-eye display element enters the left eye, for example, occurs, which causes degradation of display quality. Particularly, the effect of crosstalk increases in the case where the optical system is enlarged in order to increase the viewing angle in the left-right direction. The crosstalk means that display light from the left or right display element enters the eye different from the intended eye. This is described hereinafter with reference to FIG. 16. FIG. 16 is a top view schematically showing the structure of a display element and an optical system.

A beam splitter 122L and a combiner 121L are placed in front of the left eye EL. Likewise, a beam splitter 122R and a combiner 121R are placed in front of the right eye ER. Display light L11 from a left-eye display element 101L placed above the beam splitter 122L is reflected by the beam splitter 122L and enters the combiner 121L. The display light L11 reflected by the combiner 121L passes through the beam splitter 122L and enters the left eye EL.

However, part of the display light L11 reflected by the combiner 121L enters the right eye ER as crosstalk light LCT. Likewise, part of display light from a right-eye display element 101R enters the left eye EL as crosstalk light, though not shown in FIG. 16. When part of display light from the left or right display element enters the eye on the opposite side as crosstalk light, it acts as a noise component of a display image. This leads to a decrease in contrast, which causes degradation of display quality.

In the image separation device disclosed in Patent Literature 2, the ½ wave plate is placed on the optical path of display light. The phase difference of the ½ wave plate is different depending on the wavelength of incident light. Thus, there occurs a shift in the polarization state, which causes color blurring to occur in an image to be viewed.

A head-mounted display according to an embodiment includes a left-eye optical system configured to focus display light of a left-eye image from a display element unit on a left eye of a user wearing a head-mounted display, a right-eye optical system placed bilaterally symmetrically to the left-eye optical system and configured to focus display light of a right-eye image from the display element unit on a right eye of the user, and a viewing angle control sheet configured to restrict a spread angle of display light from the display element unit in a left-right direction, wherein the viewing angle control sheet is fixed to a display surface of the display element unit.

DETAILED DESCRIPTION

Specific embodiments of the present invention are described hereinafter in detail with reference to the drawings. The present disclosure, however, is not limited to the below-descried embodiments. The following description and the attached drawings are appropriately shortened and simplified to clarify the explanation.

First Embodiment

Figure 1:
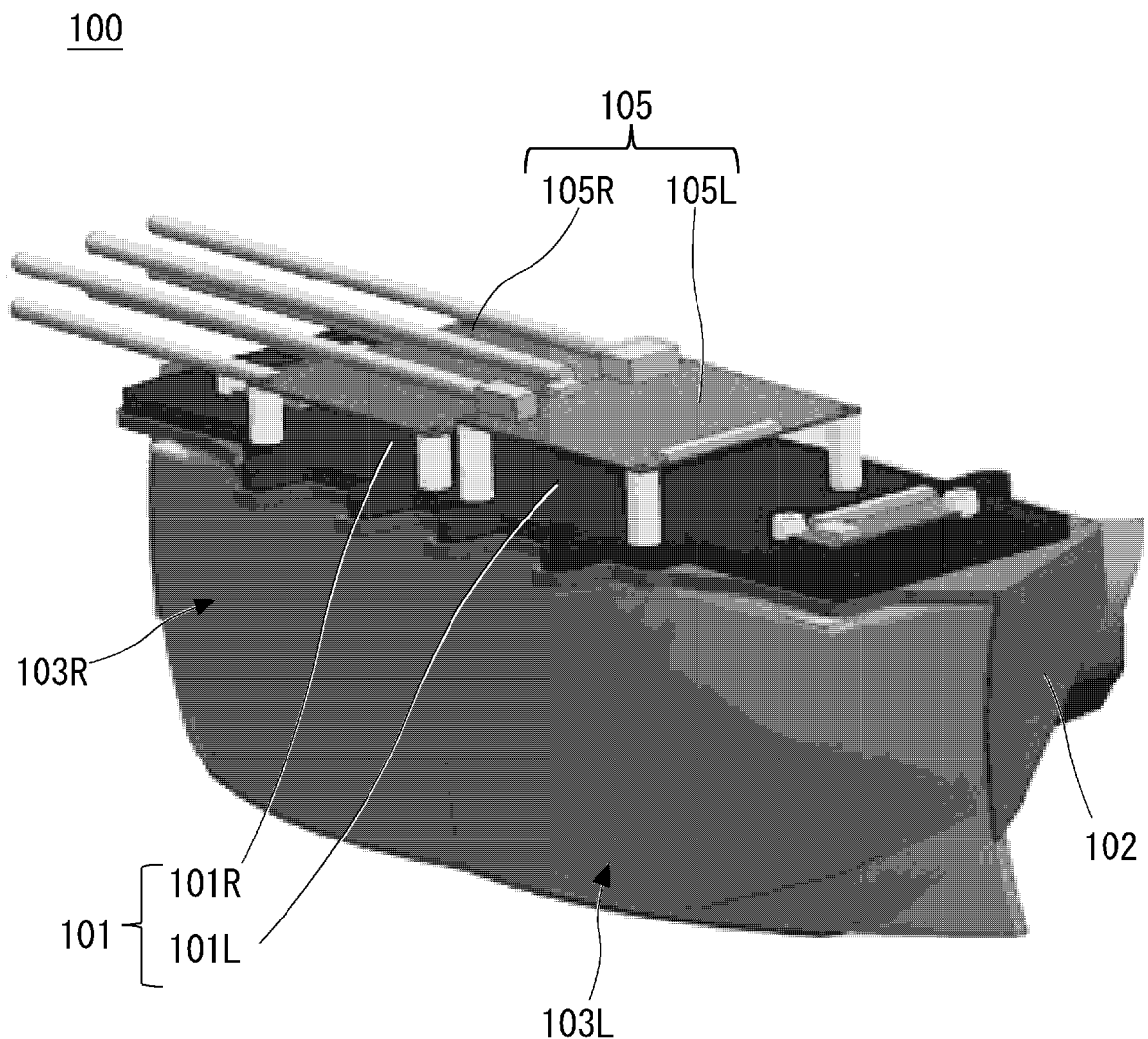
FIG. 1 is a view showing a part of the structure of a head-mounted display according to an embodiment.
Figure 1:
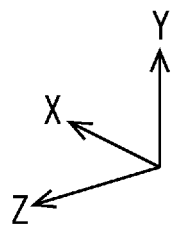
Figure 2:
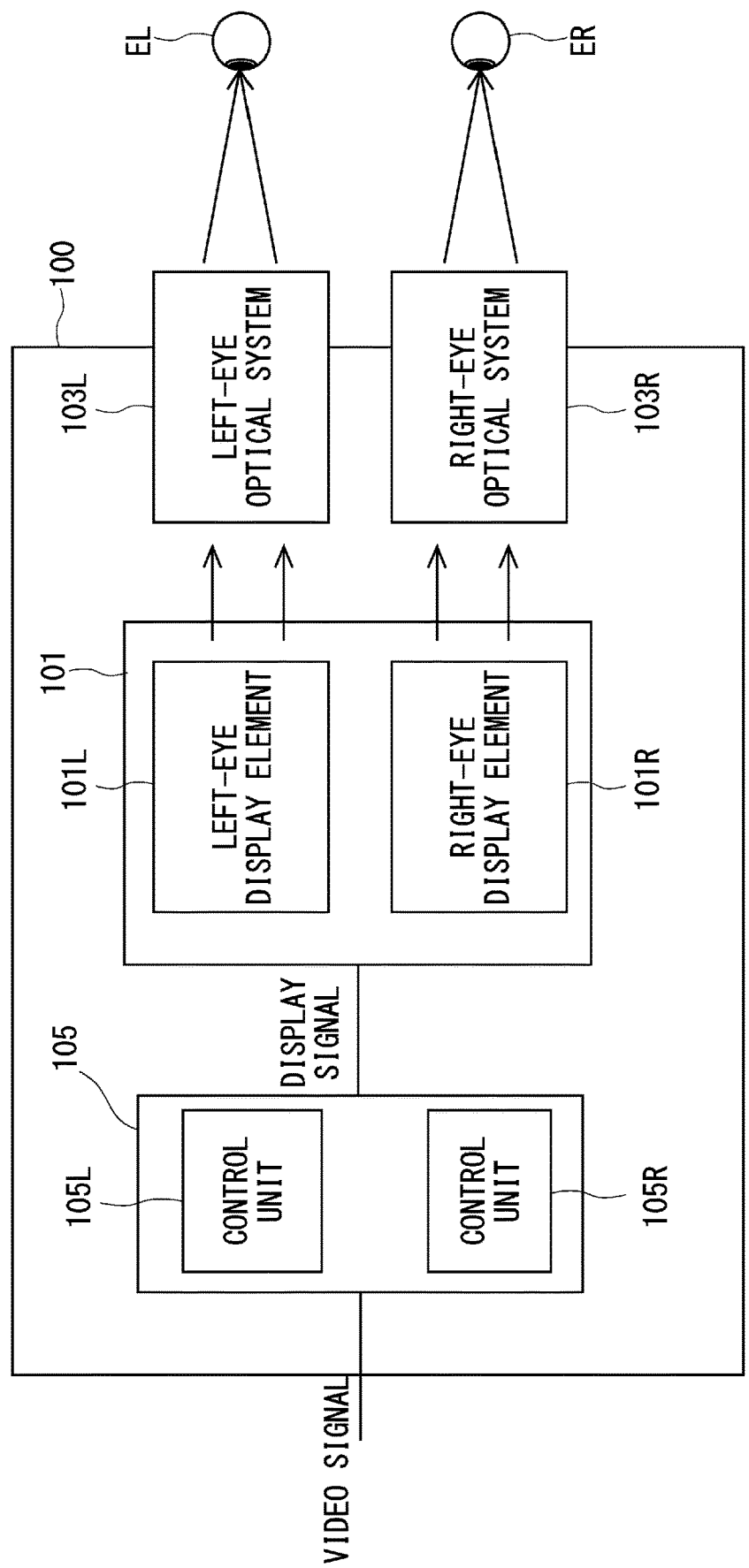
FIG. 2 is a view showing functional blocks of the head-mounted display according to the embodiment.

A head-mounted display and a display method of the same according to an embodiment are described hereinafter with reference to the drawings. FIG. 1 is a perspective view schematically showing a part of the structure of a head-mounted display 100. FIG. 2 is a view showing some of functional blocks of the head-mounted display 100. FIGS. 1 and 2 mainly show the structure related to image display of the head-mounted display 100. FIG. 1 shows the internal structure of the head-mounted display 100, and the elements shown in FIG. 1 may be covered with a cover or the like in practice.

The head-mounted display 100 is applicable to various purposes, such as game, entertainment, industrial, medical, and flight simulation purposes. The head-mounted display 100 may be a VR (Virtual Reality) head-mounted display, an AR (Augmented Reality) head-mounted display, or an MR (Mixed Reality) head-mounted display, for example.

To clarify the explanation, an XYZ three-dimensional Cartesian coordinate system is used in the following description. As viewed from a user, the front-back direction (depth direction) is Z direction, the left-right direction (horizontal direction) is X direction, and the up-down direction (vertical direction) is Y direction. The front direction is +Z direction, the back direction is −Z direction, the right direction is +X direction, the left direction is −X direction, the up direction is +Y direction, and the down direction is −Y direction. The direction of clockwise rotation toward the +X direction around the X-axis of rotation is θX direction, the direction of clockwise rotation toward the +Y direction around the Y-axis of rotation is θY direction, and the direction of clockwise rotation toward the +Z direction around the Z-axis of rotation is θZ direction.

A user, which is not shown, is wearing the head-mounted display 100. The head-mounted display 100 includes a display element unit 101, a frame 102, a left-eye optical system 103L, a right-eye optical system 103R, and a control unit 105. The control unit 105 includes a control unit 105L and a control unit 105R.

The frame 102 has a goggle or glasses shape, and it is worn on the head of a user by a head band, which is not shown, or the like. The display element unit 101, the left-eye optical system 103L, the right-eye optical system 103R, the control unit 105L, and the control unit 105R are mounted on the frame 102. Note that, although the goggle-type head-mounted display 100 is shown in FIG. 1, the head-mounted display may be a glasses-shaped non-immersive head-mounted display.

The display element unit 101 includes a left-eye display element 101L and a right-eye display element 101R. The left-eye display element 101L generates a display image for a left eye. The right-eye display element 101R generates a display image for a right eye. Each of the left-eye display element 101L and the right-eye display element 101R includes a flat-panel display such as a liquid crystal monitor or an organic EL (Electro-Luminescence) monitor. The left-eye display element 101L and the right-eye display element 101R may be curve-shaped displays. Each of the left-eye display element 101L and the right-eye display element 101R includes a plurality of pixels arranged in an array. The array arrangement is not limited to a two-dimensional array, and it may be a PenTile array or the like. The left-eye display element 101L is placed on the left side (−X side) of the right-eye display element 101R.

The control unit 105 is placed above (on the +Y side) of the display element unit 101. A video signal, a control signal, and power from the outside are supplied to the control unit 105. For example, a video signal and the like are input to the control unit 105 by wired connection such as HDMI (registered trademark) or wireless connection such as WiFi (registered trademark) or BlueTooth (registered trademark). The head-mounted display 100 may include a video generation unit (not shown) that generates a video signal, and a video signal or the like generated by the video generation unit may be input to the control unit 105.

Each of the control unit 105L and the control unit 105R includes a display driving circuit or the like. The control unit 105L generates a display signal of a left-eye image on the basis of a video signal, a control signal and the like and outputs it to the left-eye display element 101L. The left-eye display element 101L thereby outputs display light for displaying the left-eye image. The control unit 105R generates a display signal of a right-eye image on the basis of a video signal, a control signal and the like and outputs it to the right-eye display element 101R. The right-eye display element 101R thereby outputs display light for displaying the right-eye image. In this manner, the control unit 105 outputs display signals to the display element unit 101.

Note that the display element unit 101 does not necessarily have the structure in which the left-eye display element 101L and the right-eye display element 101R are separate display elements, and it may have a single display element. The single display element may generate a display image for a left eye and a display image for a right eye. In this case, the display element unit 101 generates a left-eye image by using a part on one side of the display area of the display and generates a right-eye image by using a part on the other side of the display area of the display.

Some or all of the display element unit 101, the control unit 105 and the like are not necessarily fixed to the frame 102, and they may be mounted detachable from the frame 102. For example, the display element unit 101, the control unit 105 and the like may be implemented by mounting a smartphone or a tablet computer on the frame 102. In this case, an application program (app) that generates display images for the head-mounted display is previously installed into the smartphone or the like.

The left-eye optical system 103L guides the display light that is output from the left-eye display element 101L to the left eye EL of a user as a left-eye image. The right-eye optical system 103R guides the display light that is output from the right-eye display element 101R to the right eye of a user as a right-eye image PR. The left-eye optical system 103L is placed on the left side (−X side) of the right-eye optical system 103R. The left-eye optical system 103L is placed in front (+Z direction) of the left eye EL of a user. The right-eye optical system 103R is placed in front (+Z direction) of the right eye ER of a user. Thus, the left-eye optical system 103L and the right-eye optical system 103R are bilaterally symmetric when viewed from a user. This allows a user to see a virtual image of a display image generated by the display element unit 101 in the front (in the +Z direction).

The head-mounted display 100 according to this embodiment is a semitransparent head-mounted display 100. Thus, the left-eye optical system 103L and the right-eye optical system 103R include a combiner, which is described later. In the semitransparent head-mounted display 100, display light from the display element unit 101 and outside light enter the left eye EL and the right eye ER. This allows the user to see a superimposed image on which a display image is superimposed on a view in the front (in the +Z direction).

Figure 3:
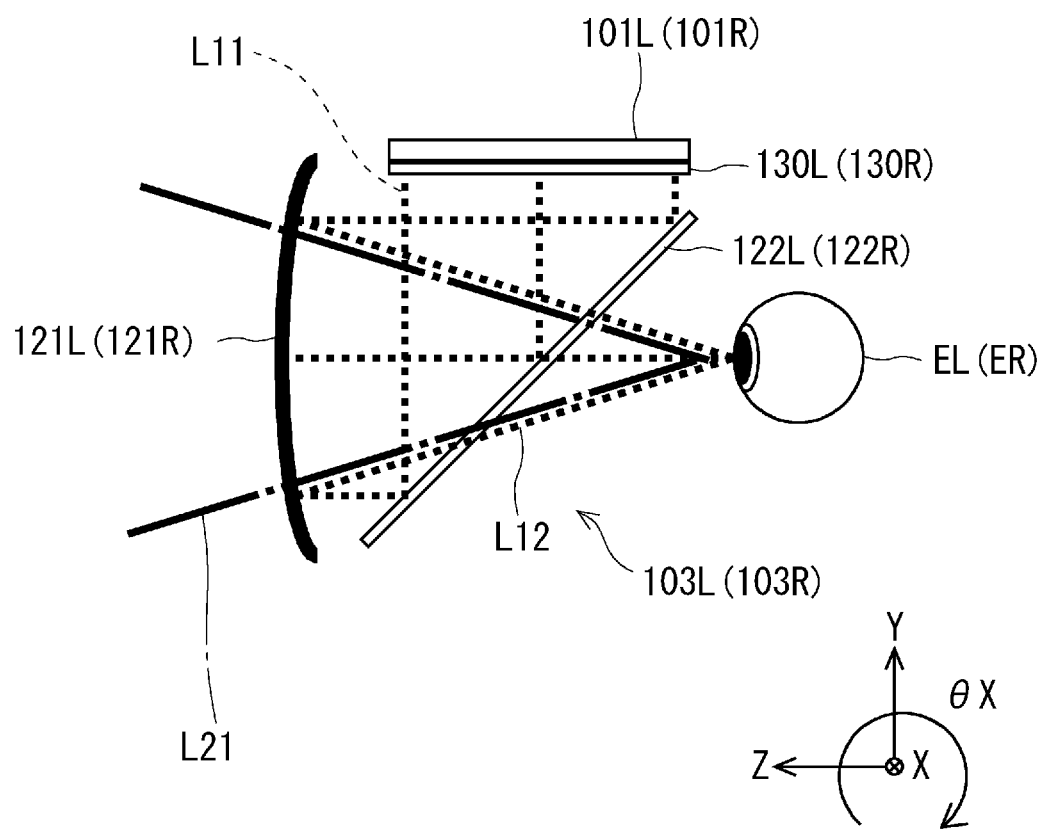
FIG. 3 is a side view schematically showing the structure of an optical system of a head-mounted display according to a first embodiment.
Figure 4:
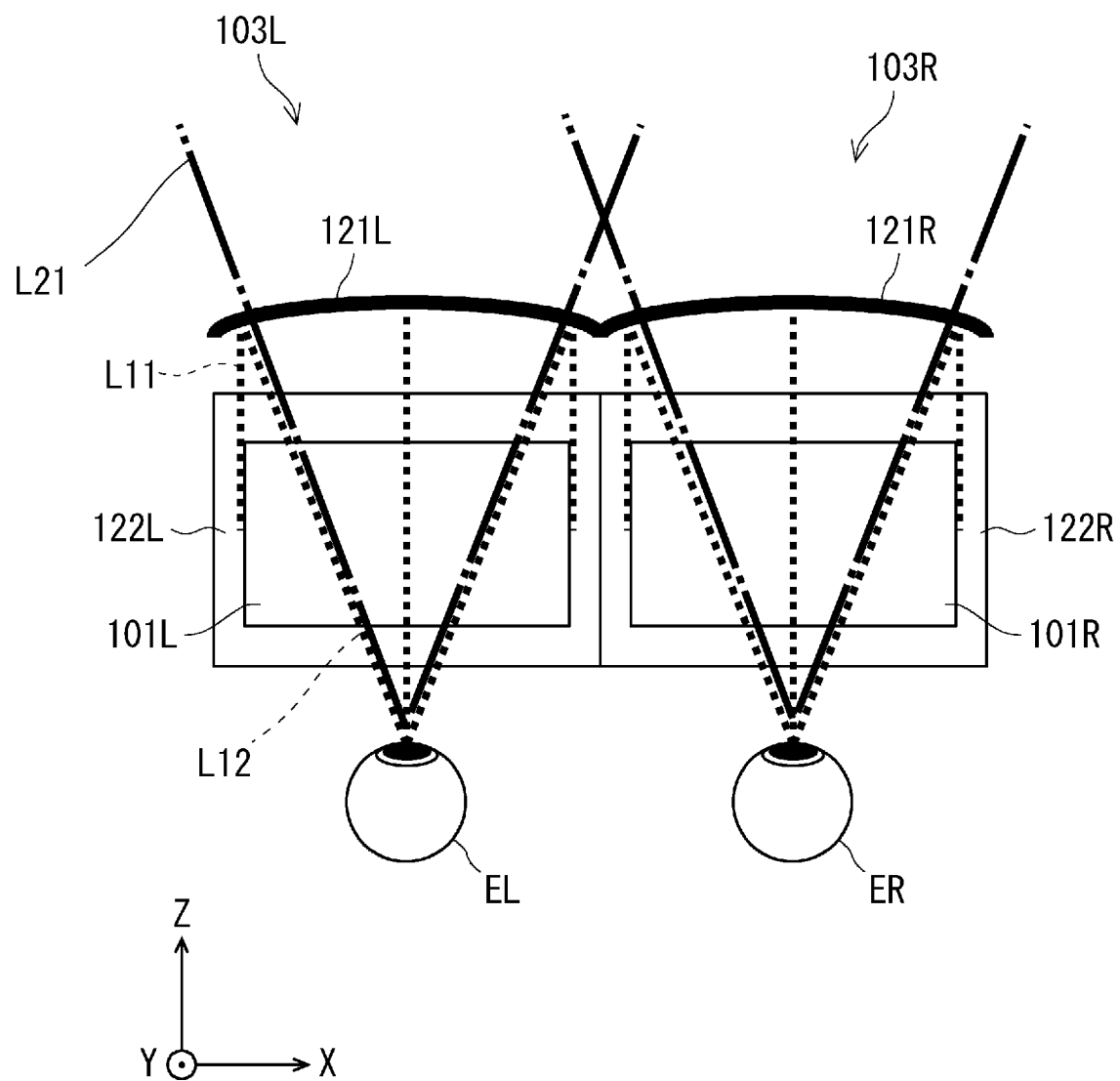
FIG. 4 is a top view schematically showing the structure of the optical system of the head-mounted display according to the first embodiment.

An example of the left-eye optical system 103L and the right-eye optical system 103R (which are collectively referred to simply as an optical system below) is described hereinafter. FIG. 3 is a side view schematically showing an optical system. FIG. 4 is a top view schematically showing the structure of the optical system. Note that the left-eye optical system 103L and the right-eye optical system 103R have the same structure, and therefore the left-eye optical system 103L is mainly described in the following description.

The left-eye optical system 103L includes a combiner 121L, a beam splitter 122L, and a viewing angle control sheet 130L. The combiner 121L and the beam splitter 122L are fixed to the frame 102 shown in FIG. 1.

The combiner 121L is a concave mirror, and the beam splitter 122L is a plane mirror. The beam splitter 122L may have a curved surface shape. The combiner 121L and the beam splitter 122L are beam splitters such as half mirrors, and they reflect part of incident light and transmits part of incident light. The combiner 121L and the beam splitter 122L are placed in front (+Z direction) of the user's left eye EL. Further, the combiner 121L is placed in front (+Z direction) of the beam splitter 122L.

The left-eye display element 101L is placed above (in the +Y direction) the beam splitter 122L. The left-eye display element 101L outputs display light L11 for forming an image. Further, the left-eye display element 101L is provided with the viewing angle control sheet 130L. To be specific, the viewing angle control sheet 130L is attached to the lower surface, which is the display surface, of the left-eye display element 101L. The viewing angle control sheet 130L functions as an angle control means for restricting the output angle of the display light L11 in the left-right direction (X direction). The viewing angle control sheet 130L is described later.

First, the display light L11 from the left-eye display element 101L is described hereinafter. The display surface of the left-eye display element 101L faces downward (in the −Y direction). Thus, the display light L11 from the left-eye display element 101L is output in the −Y direction. The viewing angle control sheet 130L is placed on the lower side (on the −Y side) of the left-eye display element 101L. Further, the beam splitter 122L, which is tilted in the OX direction, is placed below (in the −Y direction) the left-eye display element 101L. The display light L11 from the left-eye display element 101L passes through the viewing angle control sheet 130L and enters the beam splitter 122L. The beam splitter 122L reflects part of the display light L11. The display light L11 reflected by the beam splitter 122L is reflected forward (in the +Z direction). The display light L11 reflected by the beam splitter 122L is reflected by the combiner 121L.

The combiner 121L reflects the display light L11 backward (in the −Z direction). The display light L11 reflected by the combiner 121L is referred to as display light L12. The combiner 121L is a concave mirror, and reflects the display light L11 so as to focus the display light L12 toward the left eye EL. The display light L12 reflected by the combiner 121L enters the beam splitter 122L. In the case where the transmittance of the beam splitter 122L is 50%, approximately half of the amount of the display light L12 passes through the beam splitter 122L. The display light L12 that has passed through the beam splitter 122L enters the left eye EL. In this manner, the left-eye optical system 103L guides the display light L11 from the left-eye display element 101L toward the user's left eye EL. The optical system allows displaying a virtual image in front (in the +Z direction) of the user. Further, since a concave mirror is used as the combiner 121L, the display image is displayed in a larger scale.

Outside light L21 from the front (+Z direction) of the user is described hereinafter. In the case where the transmittance of the beam splitter 122L is 50%, approximately half of the amount of the outside light L21 from the front (the +Z direction) of the user passes through the combiner 121L. The outside light L21 that has passed through the combiner 121L enters the beam splitter 122L. The beam splitter 122L lets part of the outside light L21 pass through. The outside light L21 that has passed through the beam splitter 122L enters the left eye EL.

Since the head-mounted display 100 is semitransparent, the combiner 121L combines the display light L12 from the left-eye display element 101L with the outside light L21. By placing the combiner 121L in front of the left eye EL, the head-mounted display 100 functions as an optical see-through display. A display image is superimposed on a view in front (in the +Z direction) of a user. The user can thereby see a view on which a display image is superimposed.

FIG. 3 shows an example of the optical system, and the optical system is not limited to the structure shown in FIG. 3. The optical system is not particularly limited as long as it can guide the display light L11 from the display element unit 101 and the outside light L21 to the left eye EL and the right eye ER. For example, a polarizing beam splitter that transmits or reflects light depending on the polarization state can be used as the beam splitter 122L. In this case, a ¼ wave plate may be placed between the beam splitter 122L and the combiner 121L.

Further, a flat half-mirror can be used as the combiner 121L. In this case, a lens or the like for focusing the display light on the left eye EL may be placed between the beam splitter 122L and the left-eye display element 101L.

The head-mounted display 100 may be a non-transmissive, i.e., VR-type, head-mounted display. In this case, the combiner 121L is a full mirror, not a half mirror. For example, a concave mirror that reflects and focus substantially all of the light may be used instead of the combiner 121L.

Figure 5:
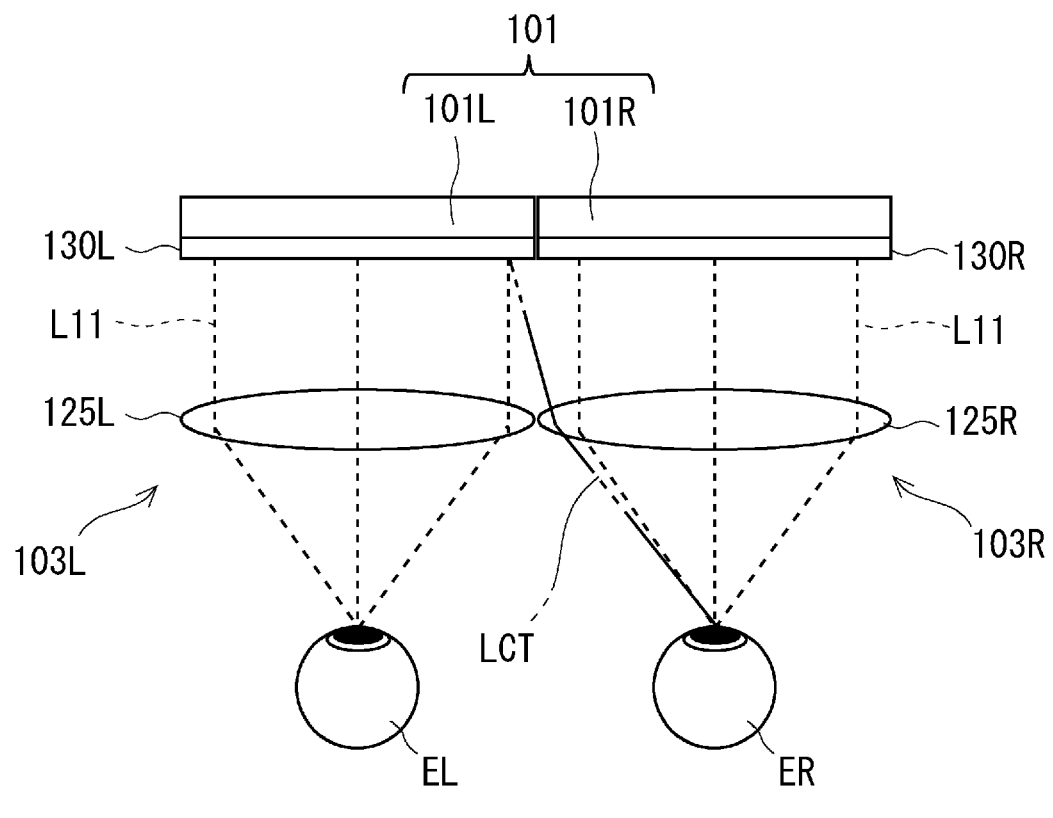
FIG. 5 is a top view schematically showing another structure of the optical system of the head-mounted display.

Further, the optical system may be an optical system using a lens, instead of a concave mirror such as the combiner 121L, as an optical member that focuses the display light L11. FIG. 5 is a top view schematically showing an example of the optical system that focuses the display light L11 by using a lens.

A left-eye lens unit 125L is placed in front (in the +Z direction) of the left eye EL. The left-eye display element 101L is placed in front (in the +Z direction) of the left-eye lens unit 125L. The left-eye lens unit 125L includes one or more lenses. The left-eye optical system 103L is formed using the left-eye lens unit 125L.

The display surface of the left-eye display element 101L faces backward (in the −Z direction). The left-eye display element 101L outputs the display light L11 backward (in the −Z direction). The viewing angle control sheet 130L is placed on the display surface of the left-eye display element 101L. Part of the display light L11 of the left-eye display element 101L passes through the viewing angle control sheet 130L and enters the left-eye lens unit 125L. The left-eye lens unit 125L focuses the display light L11 from the left-eye display element 101L on the left eye EL.

A right-eye lens unit 125R is placed in front (in the +Z direction) of the right eye ER. The right-eye display element 101R is placed in front (in the +Z direction) of the right-eye lens unit 125R. The right-eye lens unit 125R includes one or more lenses. The right-eye optical system 103R is formed using the right-eye lens unit 125R. The right-eye display element 101R is placed on the right side (+X side) of the left-eye display element 101L. The right-eye lens unit 125R is placed on the right side (+X side) of the left-eye lens unit 125L. Thus, the left-eye optical system 103L and the right-eye optical system 103R are arranged symmetrically in the left-right direction (X direction) when viewed from the user.

The display surface of the right-eye display element 101R faces backward (in the −Z direction). The right-eye display element 101R outputs the display light L11 backward (in the −Z direction). The viewing angle control sheet 130R is placed on the display surface of the right-eye display element 101R. Part of the display light L11 of the right-eye display element 101R passes through the viewing angle control sheet 130R and enters the right-eye lens unit 125R. The right-eye lens unit 125R focuses the display light L11 from the right-eye display element 101R on the right eye ER.

Even in the optical system using such a lens, crosstalk light LCT occurs as shown in FIG. 5 if the viewing angle control sheets 130L and 130R are not used. For example, the display light L11 that goes from the left-eye display element 101L toward the right-eye lens unit 125R acts as crosstalk light LCT. Then, the crosstalk light LCT is refracted by the right-eye lens unit 125R and enters the right eye ER. Further, part of the display light L11 from the right-eye display element 101R acts as crosstalk light LCT that is refracted by the left-eye lens unit 125L and enters the right eye ER, though not shown. Therefore, in this embodiment, the viewing angle control sheet 130L and the viewing angle control sheet 130R are placed in close proximity to the left-eye display element 101L and the right-eye display element 101R, respectively. This reduces the occurrence of crosstalk.

Figure 6:
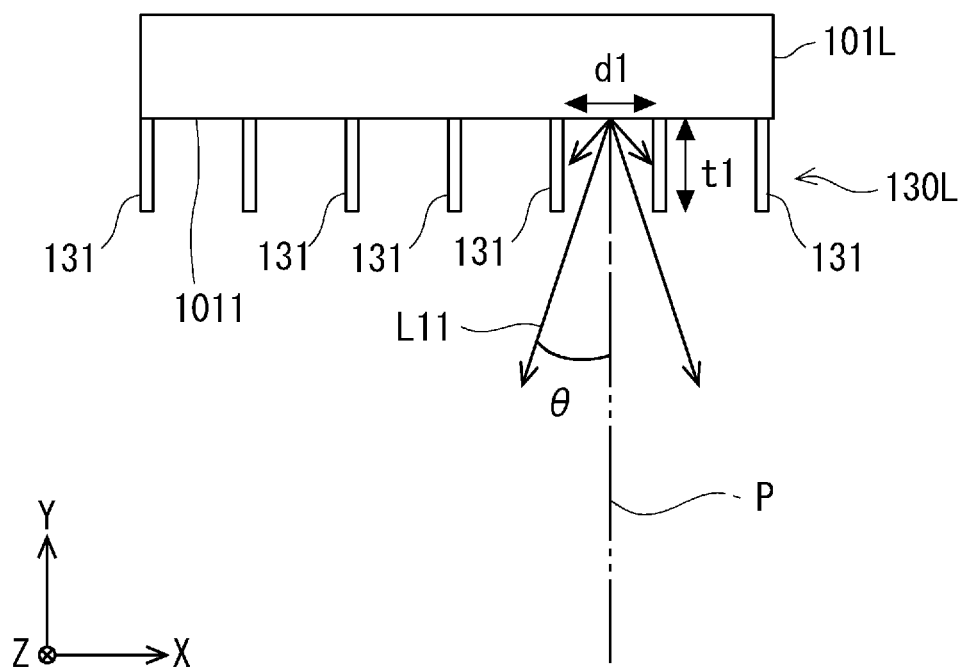
FIG. 6 is an X-Y plan view schematically showing the structure of a viewing angle control sheet 130L.
Figure 7:
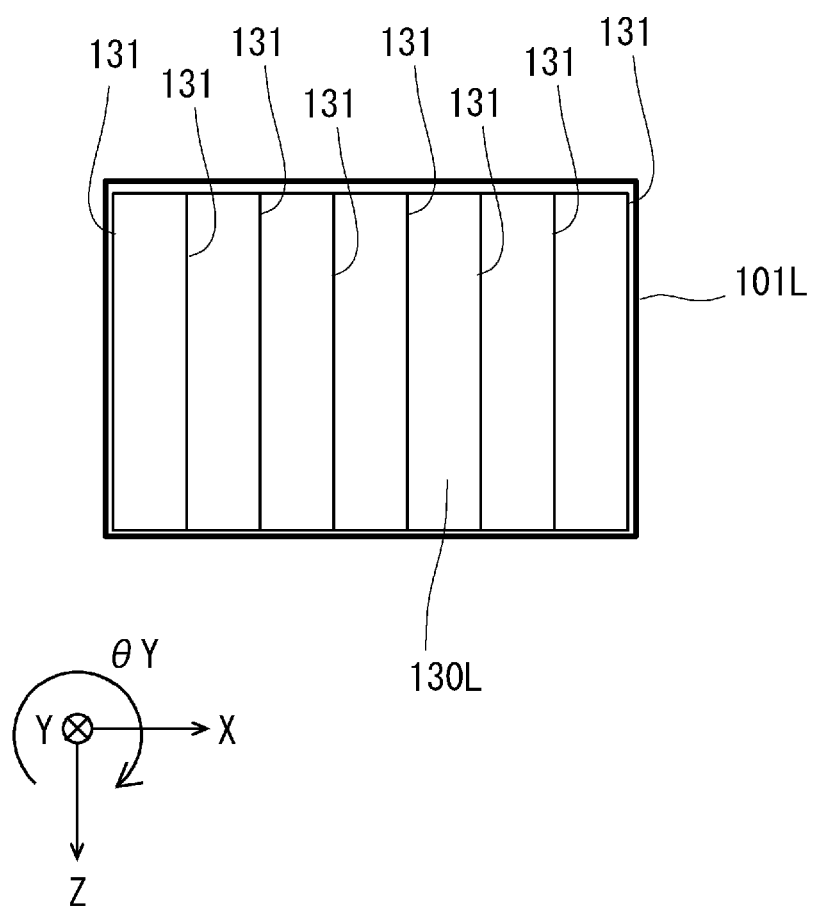
FIG. 7 is an X-Z plan view schematically showing the structure of the viewing angle control sheet 130L.

The structure of the viewing angle control sheet 130L is described hereinafter. FIG. 6 is an X-Y plan view schematically showing the structure of the viewing angle control sheet 130L. FIG. 7 is an X-Z plan view schematically showing the structure of the viewing angle control sheet 130L. FIG. 7 is a view showing the viewing angle control sheet 130L when viewed from the beam splitter 122L.

The viewing angle control sheet 130L includes a plurality of light shielding parts 131. The light shielding parts 131 are in the form of plates with the long-side direction and the short-side direction, and its long-side direction is parallel to the Z direction. The plurality of light shielding parts 131 are arranged in a repetitive manner with a predetermined space therebetween in the left-right direction (X direction). The short-side direction of the light shielding parts 131 is parallel to the Y direction. The light shielding parts 131 serve as partitions placed vertically downward (in the −Y direction) from the display surface 1011 of the left-eye display element 101L. Thus, the viewing angle control sheet 130L has a louver structure with the plurality of light shielding parts 131. The light shielding parts 131 are made of a black material or the like so as to absorb light. The light shielding parts 131 restrict the spread angle of the display light L11 in the left-right direction (X direction). Specifically, the display light L11 that is output from the left-eye display element 101L at an angle wider than a predetermined spread angle in the left-right direction (X direction) enters the light shielding parts 131 and is absorbed.

As shown in FIG. 6, in the XY-plane, the angle from a perpendicular line P of the display surface 1011 of the left-eye display element 101L is a spread angle θ. The light shielding parts 131 shield the display light L11 with the wide spread angle θ. The light shielding parts 131 restrict the spread angle of the display light L11. In this example, since the display surface 1011 of the left-eye display element 101L is parallel to the X-Z plane, the perpendicular line P is parallel to the Y direction.

As shown in FIG. 7, the long-side direction of each of the light shielding parts 131 is parallel to the Z direction. In other words, the long-side direction of the plurality of light shielding parts 131 is parallel to each other along the Z direction. The long-side direction of the light shielding parts 131 is not limited to the Z direction, and it may be a direction that is rotated from the Z direction to the θY direction. In this example, the plurality of light shielding parts 131 are arranged at equally spaced intervals. For example, a plurality of pixels are placed between two adjacent light shielding parts 131. The long-side direction of the light shielding parts 131 may be the same as or different from the pixel array direction of the left-eye display element 101L.

The viewing angle control sheet 130L may be made of a resin material or the like. The viewing angle control sheet 130L may be a flexible film or a rigid plate. A prism sheet where a plurality of prisms are arranged in an array can be used as the viewing angle control sheet 130L. Alternatively, the viewing angle control sheet 130L may include the light shielding parts 131 that are metal plates or the like having a louver structure formed by cutting, molding or the like. Further, although a space is left between the adjacent light shielding parts 131 in FIG. 6, a space between the adjacent light shielding parts 131 may be filled with a transparent resin material or the like. Further, the plurality of light shielding parts 131 may be placed on a base material sheet.

The viewing angle control sheet 130L is preferably attached to the display surface 1011 of the left-eye display element 101L. The viewing angle control sheet 130L is thereby fixed to the display surface 1011 of the left-eye display element 101L. For example, the viewing angle control sheet 130L may be an adhesive sheet having a size large enough to cover substantially the whole area of the display surface 1011 of the left-eye display element 101L, for example. Alternatively, the viewing angle control sheet 130L may be adhered to the display surface 1011 of the left-eye display element 101L by applying an adhesive agent to the backside (on the +Y side) of the viewing angle control sheet 130L. This prevents displacement of the viewing angle control sheet 130L from the left-eye display element 101L.

In the case where the left-eye display element 101L is detachable, the left-eye display element 101L is fixed onto the viewing angle control sheet 130L. This prevents displacement of the viewing angle control sheet 130L from the left-eye display element 101L. Note that the viewing angle control sheet 130L may be placed inside the left-eye display element 101L, rather than being placed on the display surface 101l of the left-eye display element 101L. The viewing angle control sheet 130L may be placed apart from the display surface 101l.

Further, in the case where the left-eye display element 101L is a liquid crystal display device, a backlight, which is not shown, is placed on the backside (+Y side) of the left-eye display element 101L as the viewing angle control sheet 130L. The backlight includes a prism sheet, a light guide plate and the like placed therein. The prism sheet placed in the backlight may be used as the viewing angle control sheet 130L. Alternatively, the backside (+Y side) of the light guide plate may be processed so as to restrict the output light from the light guide plate placed inside the backlight. Thus, the viewing angle control sheet 130L is placed in close proximity to the left-eye display element 101L.

Figure 8:
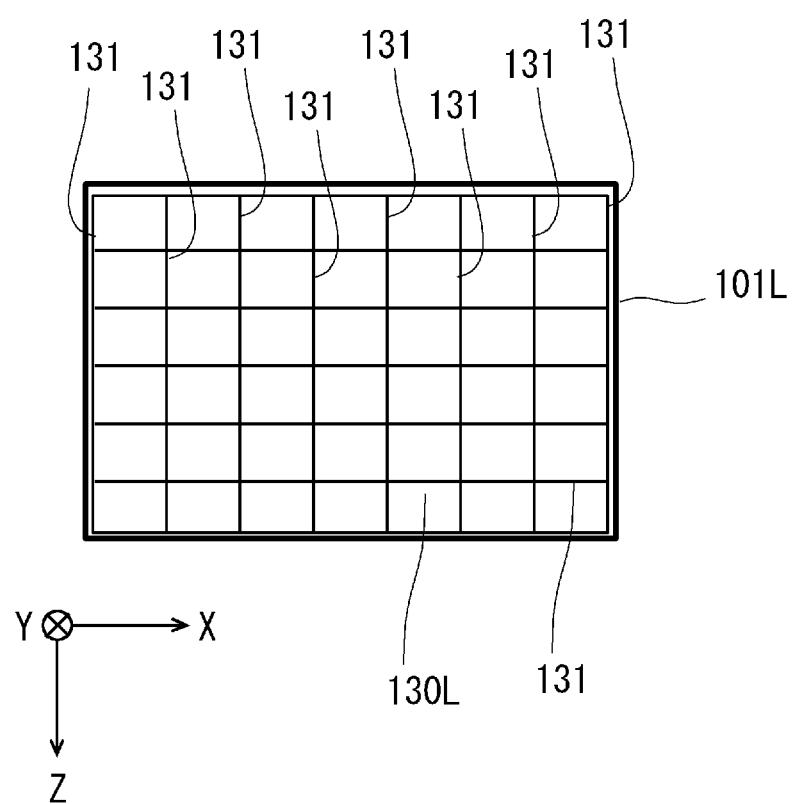
FIG. 8 is an X-Z plan view showing a layout example of the viewing angle control sheet 130L.

Although the long-side direction of the light shielding parts 131 is along the Z direction in FIG. 7, the layout of the light shielding parts 131 is not limited to the structure shown in FIG. 7. Examples of the layout of the light shielding parts 131 are described hereinafter with reference to FIGS. 8 and 9. In FIG. 8, the light shielding parts 131 are formed in a grid pattern. Specifically, the viewing angle control sheet 130L includes a plurality of light shielding parts 131 whose long-side direction is along the Z direction and a plurality of light shielding parts 131 whose long-side direction is along the X direction. In this case, an area surrounded by the light shielding parts 131 has the shape of a rectangle.

Figure 9:
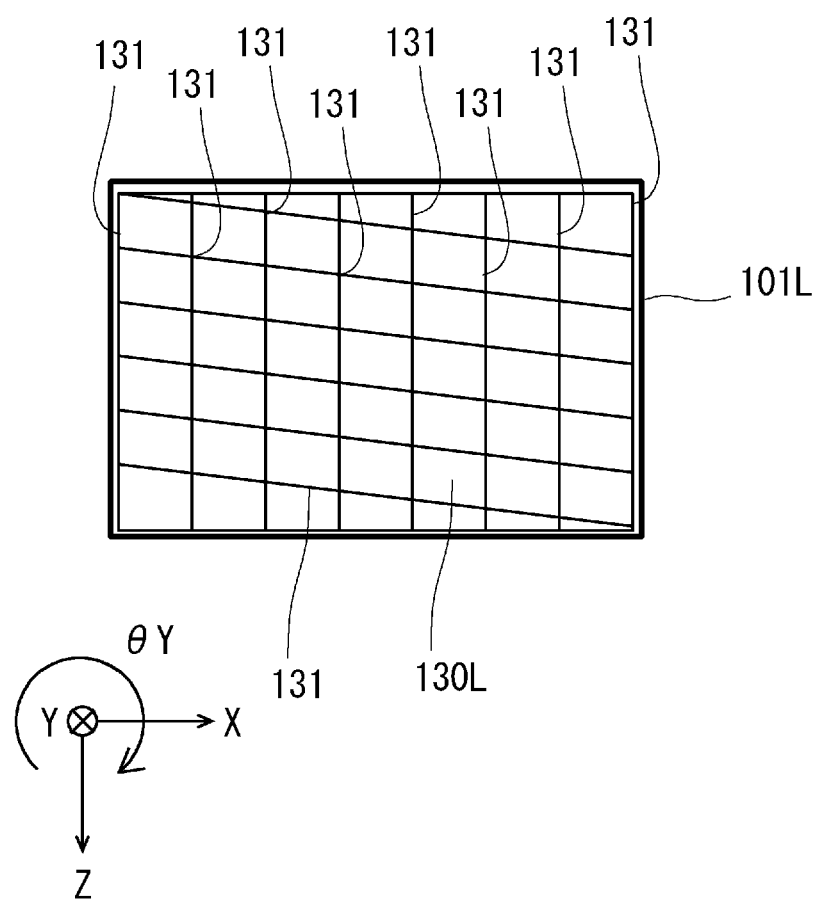
FIG. 9 is an X-Z plan view showing the structure of a layout example of the viewing angle control sheet 130L.

Further, as shown in FIG. 9, an area surrounded by the light shielding parts 131 may have the shape of a parallelogram. In FIG. 9, the viewing angle control sheet 130L includes a plurality of light shielding parts 131 whose long-side direction is along the Z direction and a plurality of light shielding parts 131 whose long-side direction is tilted in the θY direction from the X direction.

In this manner, the spread angle θ in the left-right direction (X direction) is restricted by placing the viewing angle control sheet 130L on the left-eye display element 101L. Specifically, the light shielding parts 131 absorb the display light L11 with the wide spread angle θ. This prevents the display light L11 of the left-eye display element 101L from entering the right eye ER and thereby reduces crosstalk. The degradation of contrast or the like is thereby prevented, and the head-mounted display 100 with high display quality is thereby achieved. Further, since a polarizer and a wave plate are not used, the occurrence of color blurring is reduced.

Figure 16:
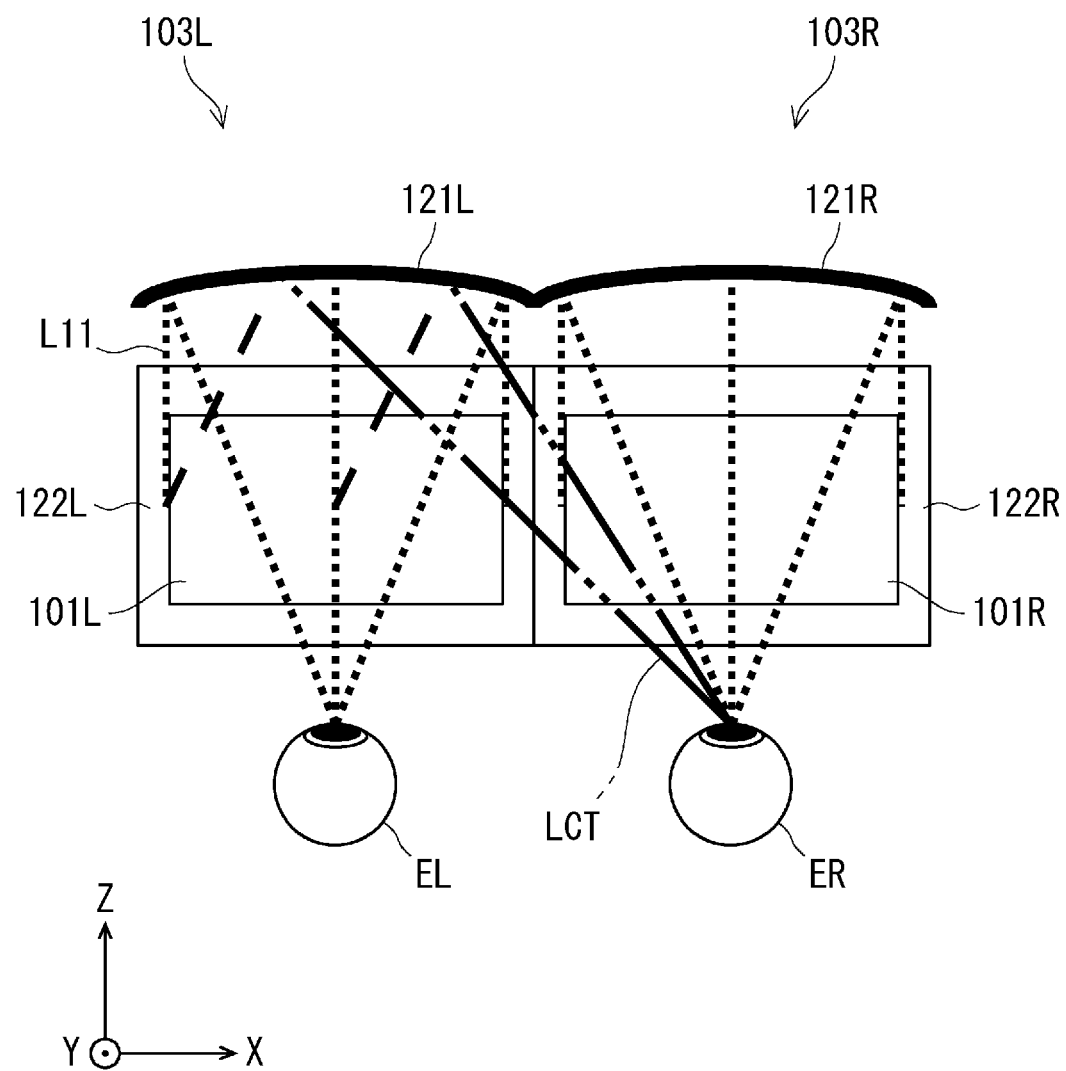
FIG. 16 is a view illustrating crosstalk of display light.

To be specific, the display light L11 that acts as the crosstalk light LCT as shown in FIG. 5 or 16 has a wide spread angle in the left-right direction (X direction). The light shielding parts 131 of the viewing angle control sheet 130L shield the display light L11 having a wide spread angle that becomes the crosstalk light LCT. The occurrence of the crosstalk light LCT is thereby reduced. Further, the effect of crosstalk is reduced even in the case of using the optical system having a wide viewing angle in the left-right direction (X direction) in the outside world. A wide viewing angle is thereby obtained on both sides in the left-right direction (X direction) in the outside world, which gives a sense of openness.

Although the viewing angle control sheet 130L is described above, the viewing angle control sheet 130R has the same structure as the viewing angle control sheet 130L. This prevents the display light from the right-eye display element 101R from entering the left eye EL. A noise component of a display image due to crosstalk is thereby reduced. This prevents degradation of display quality.

Further, the viewing angle control sheet 130L is placed between the beam splitter 122L and the left-eye display element 101L. The viewing angle control sheet 130L is not on the optical path from the combiner 121L to the left eye EL. The display light L12 reflected by the combiner 121L enters the left eye EL without passing through the viewing angle control sheet 130L. Likewise, the outside light L21 that has passed through the combiner 121L enters the left eye EL without passing through the viewing angle control sheet 130L. This prevents the viewing angle control sheet 130L from affecting the display light L12 and the outside light L21. This allows obtaining a wide viewing field in the outside world and appropriately superimposing and displaying a display image.

The spread angle θ of the viewing angle control sheet 130L can be determined by the geometric structure of the optical system. For example, the spread angle θ of the viewing angle control sheet 130L can be determined depending on the optical distance from the left-eye display element 101L to the combiner 121L, the optical distance from the combiner 121L to the right eye ER, the curvature radius of the combiner 121L and the like. A desired angle limit is obtained by the dimension (height) of the light shielding parts 131 in the short-side direction in the Y direction, the space between the adjacent light shielding parts 131 and the like. As shown in FIG. 6, when the dimension of the light shielding parts 131 in the short-side direction is t1, and the space between the adjacent light shielding parts 131 is d1, the expression $\tan\theta = d1/(2 \times t1)$ holds true.

Although FIGS. 7, 8 and 9 show the structure in which the light shielding parts 131 are arranged at equally spaced intervals, the space between the light shielding parts 131 is not necessarily equal. The space between the light shielding parts 131 of the viewing angle control sheet 130L can be flexibly changed. However, in order to keep a target spread angel θ, the dimension of the light shielding parts 131 in the short-side direction needs to be changed according to the space.

Figure 10:
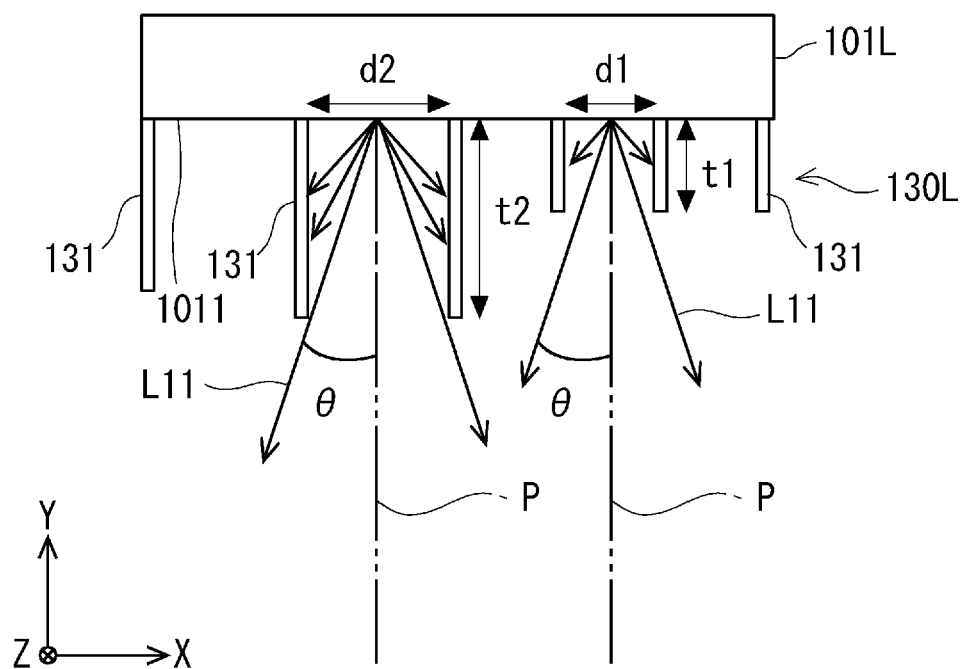
FIG. 10 is an X-Y plan view schematically showing the structure of the viewing angle control sheet 130L where light shielding parts are not equally spaced.

For example, as shown in FIG. 10, assume that the dimensions of the short sides of the two light shielding parts 131 are t1 and t2. Assume also that the space between the light shielding parts 131 with the dimension of t1 is d1, and the space between the light shielding parts 131 with the dimension of t2 is d2. In this case, $\tan\theta = d1/(2 \times t1) = d2/(2 \times t2)$. Thus, the spread angle θ can be uniform when $d1/t1 = d2/t2$.

As described earlier, the left-eye display element 101L and the right-eye display element 101R include a plurality of pixels arranged in an array. In the case where the pixels of the left-eye display element 101L are arranged in a two-dimensional array, the space between the adjacent light shielding parts 131 may be equal to the width (X direction) of a pixel of the left-eye display element 101L. Further, the space between the adjacent light shielding parts 131 may be an integral multiple of the width (X direction) of a pixel of the left-eye display element 101L. Thus, the space between the adjacent light shielding parts 131 can be determined on the basis of the layout of the pixels of the left-eye display element 101L and the right-eye display element 101R.

Second Embodiment

In a second embodiment, the structure of the viewing angle control sheet 130L is different. The long-side direction of the light shielding parts 131 is different from that in the first embodiment. To be specific, the direction of forming the light shielding parts 131 in the Z planar view is tilted from the pixel array direction with a repetitive pitch of one pixel. Note that the basic structure of the head-mounted display 100 is the same as that of the first embodiment, and the description thereof is omitted.

Figure 11:
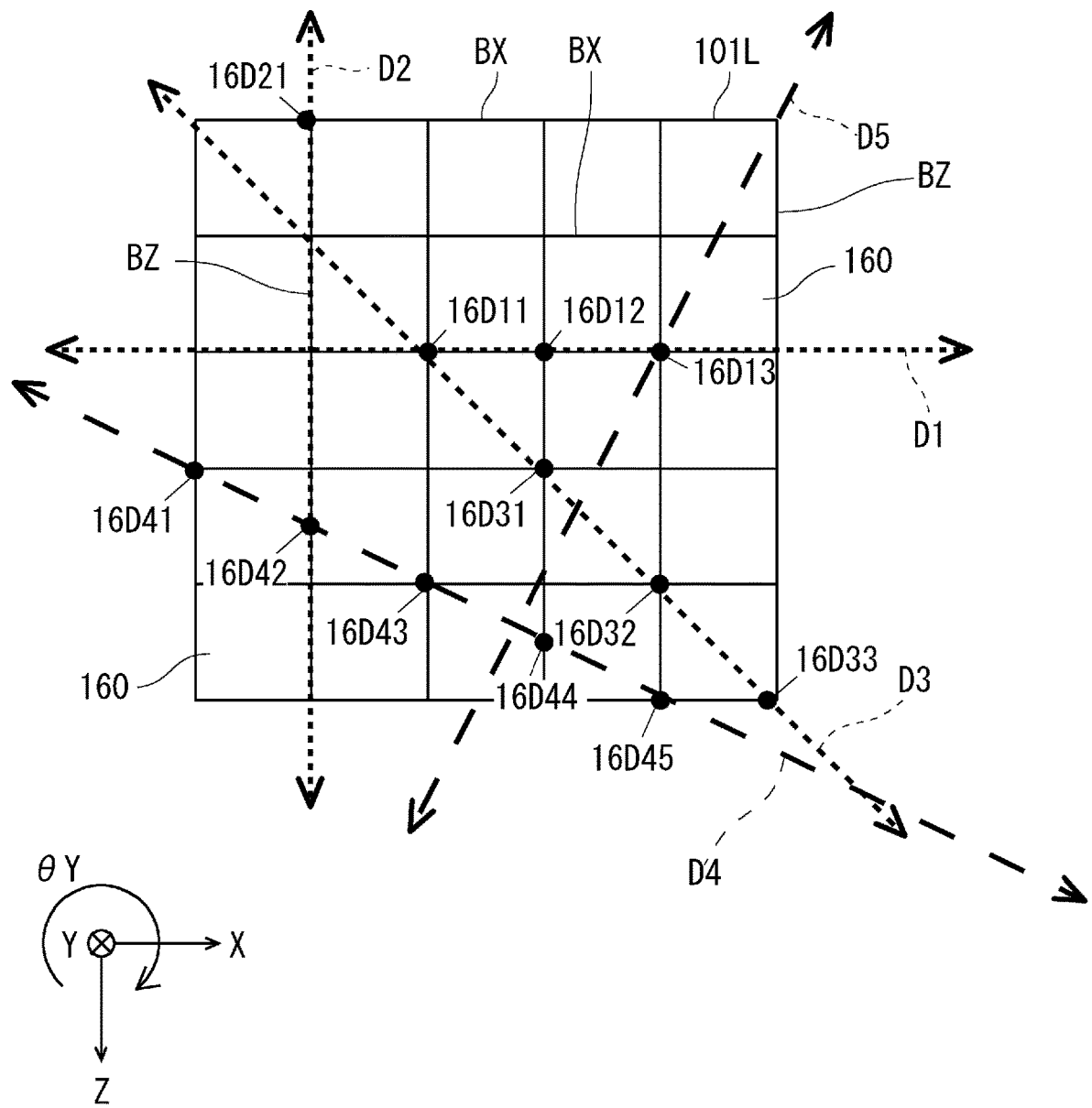
FIG. 11 is a view showing the array direction of pixels.

First, the relationship between a pixel array and an interference fringe is described with reference to FIG. 11. FIG. 11 is a view schematically showing the array of pixels 160 of the left-eye display element 101L. It is generally known that an interference fringe (moire) occurs when the periodic structure of each pattern is slightly shifted in the case of overlapping regular patterns such as pixel arrays. In this example, the pixels 160 are arranged in an array. To be specific, the plurality of pixels 160 are arranged in a two-dimensional array along the Z direction and the X direction. The array direction of the pixels 160 which is parallel to the X direction is a pixel array direction D1, and the array direction of the pixels which is parallel to the Z direction is a pixel array direction D2. Thus, one of the pixel array direction D1 and the pixel array direction D2 is a V direction (vertical direction) in the left-eye display element 101L, and the other one is an H direction (horizontal direction) in the left-eye display element 101L. Further, the boundaries of the two adjacent pixels 160 are boundaries BX, BZ. The boundary BX is a straight line parallel to the X direction, and the boundary BZ is a straight line parallel to the Z direction. In FIG. 11, six boundaries BX and six boundaries BZ are shown.

An intersection point of a straight line extending in a given direction in the X-Z plane and the boundary BX, BZ of the pixels 160 appears periodically. An intersection point of the boundary BX and the boundary BZ is a corner or an intersection point of boundaries of the pixel 160. Further, an "intersection point" indicates an intersection point of a straight line extending in a given direction and the boundary BX, BZ. The number of pixels which a straight line extending in a given direction from a corner (intersection point of boundaries) of the pixel 160 goes through until it passes through the corner (intersection point of boundaries) of the pixel 160 again is a repetitive pitch. The next intersection point of a straight line extending in the pixel array direction D1 (+X direction) from the intersection point 16D11 located at the corner (intersection point of boundaries) of the pixel 160 and the boundary BZ of the pixel 160 is an intersection point 16D12, and the yet next intersection point is an intersection point 16D13. Each of the intersection points 16D11 to 16D13 is located at the corner (intersection point of boundaries) of the pixels 160. Thus, all of the intersection points 16D11 to 16D13 are on the boundary BZ, and not located between the two adjacent boundaries BZ. In the pixel array direction D1, the repetitive pitch is one pixel. Likewise, an intersection point of a straight line extending in the pixel array direction D2 from the intersection point 16D21 located at the corner (intersection point of boundaries) of the pixel 160 and the boundary BX of the pixel 160 is located at the corner (intersection point of boundaries) of the pixel 160. Thus, in the pixel array direction D2, the repetitive pitch of pixels is one pixel.

A direction where the pixel array direction D1 is tilted at 45 degrees in the θY direction is a pixel array direction D3. The pixel array direction D3 is a diagonal direction of the pixel 160. The next intersection point of a straight line extending in the pixel array direction D3 from an intersection point 16D31 located at the corner (intersection point of boundaries) of the pixel 160 and the boundary BX of the pixel 160 is an intersection point 16D32, and the yet next intersection point is an intersection point 16D33. Each of the intersection points 16D31 to 16D33 is located at the corner (intersection point of boundaries) of the pixel 160. Thus, all of the intersection points 16D31 to 16D33 are on the corner. In no case all of the intersection points 16D31 to 16D33 are located at positions between the two adjacent boundaries BZ or between the two adjacent boundaries BX. Thus, in the pixel array direction D3, the repetitive pitch is one pixel.

In the pixel array directions D1 to D3, the repetitive pitch of pixel intervals is one pixel, and therefore an interference fringe is likely to occur if the long-side direction of the light shielding parts 131 is parallel to this direction. Specifically, since the direction in which the repetitive pitch of pixel intervals is one pixel and the long-side direction of the light shielding parts 131 are parallel, there is a possibility that a large interference fringe occurs in a display image.

On the other hand, directions where the pixel array directions D1 and D2 are tilted at 22.5 degrees in the θY direction are directions D4 and D5. The next intersection point of a straight line extending in the direction D4 from an intersection point 16D41 located at the corner (intersection point of boundaries) of the pixel 160 and the boundary BZ of the pixel 160 is an intersection point 16D43. Likewise, the next intersection point subsequent to the intersection point 16D43 is an intersection point 16D44, and the next intersection point subsequent to the intersection point 16D44 is an intersection point 16D45. Each of the intersection points 16D41, 16D43 and 16D45 is located at the corner (intersection point of boundaries) of the pixel 160. Each of the intersection points 16D42 and 16D44 is not located at the corner (intersection point of boundaries) of the pixel 160. Specifically, the intersection points 16D42 and 16D44 are located between the two adjacent boundaries BX. The intersection points 16D42 and 16D44 are located on the boundary BZ along the Z direction but not located on the boundary BX along the X direction.

Thus, in the directions D4, the repetitive pitch of pixel intervals is two pixels. In the direction D5 also, the repetitive pitch of pixel intervals is two pixels as in the direction D4. Therefore, an interference fringe is less likely to occur if the long-side direction of the light shielding parts 131 is parallel to the direction D4 or D5. Specifically, by placing the light shielding parts 131 so that they are tilted from the pixel array direction with a repetitive pitch of one pixel, an interference fringe that appears in a display image is reduced. The tilt of the long-side direction of the light shielding parts 131 with respect to the boundary BX, BZ is not limited to 22.5 degrees.

Note that, in FIG. 11, the pixels 160 have a square shape. Thus, the size in the Z direction and the size in the X direction of the pixels 160 are the same. Therefore, the pixel array direction D3 is tilted at 45 degrees in the θY direction. In the case where the pixels 160 have a rectangular shape where the sizes in the Z direction and the X direction are different, the pixel array directions D3 is a diagonal direction of the rectangular pixels 160. In this case also, the long-side direction of the light shielding parts 131 is set to a direction not parallel to any of the pixel array directions D1 to D3. The long-side direction of the light shielding parts 131 is thereby tilted from the pixel array directions D1 to D3 where the repetitive pitch is one pixel.

Figure 12:
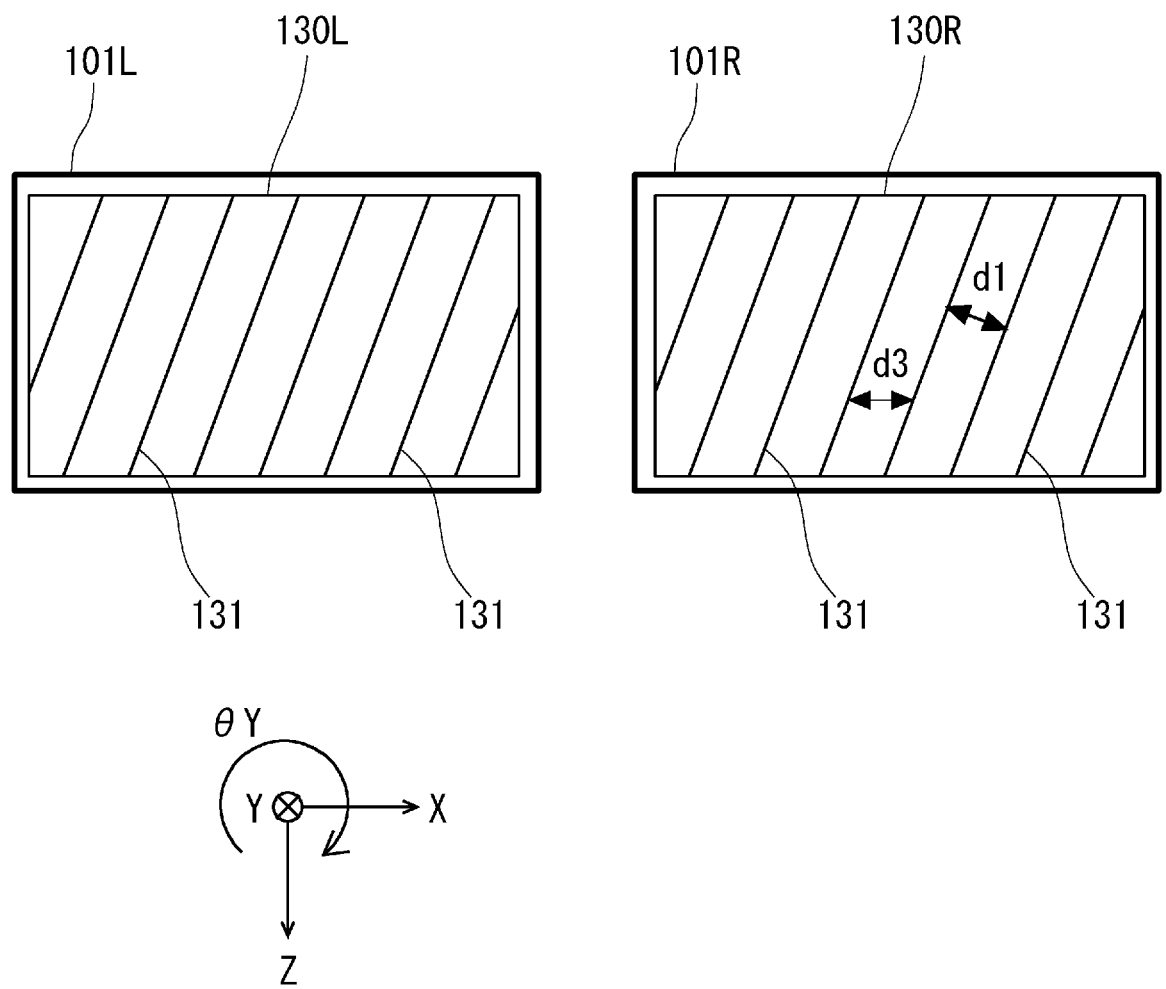
FIG. 12 is a view showing an example of light shielding parts 131 in the viewing angle control sheet.
Figure 13:
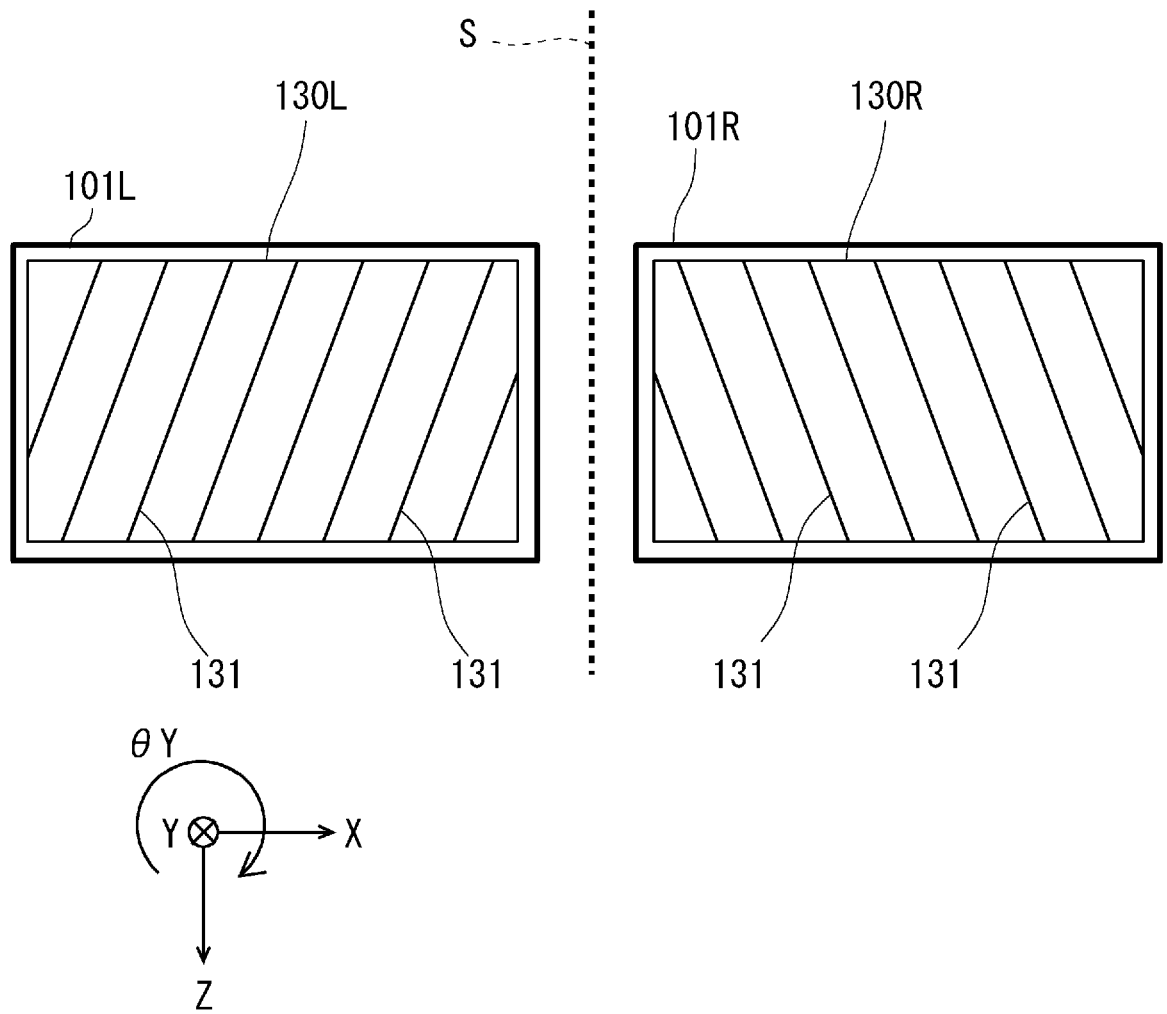
FIG. 13 is a view showing an example of light shielding parts 131 in the viewing angle control sheet.

In this manner, it is preferred that the viewing angle control sheet 130L is placed in such a way that the long-side direction of the light shielding parts 131 is tilted from the pixel array directions D1 to D3 where the repetitive pitch is one pixel. FIGS. 12 and 13 show a layout example of the light shielding parts 131 in the left and right viewing angle control sheet 130L and 130R. Note that, in FIGS. 12 and 13, the pixel array direction is the same direction as shown in FIG. 11.

In FIGS. 12 and 13, the long-side direction of the light shielding parts 131 is tilted from the pixel array directions where the repetitive pitch is one pixel. To be specific, in FIG. 12, the long-side directions of the light shielding parts 131 are parallel to each other in the left and right optical systems. To be specific, the long-side direction of the light shielding parts 131 of the viewing angle control sheet 130L and the long-side direction of the light shielding parts 131 of the viewing angle control sheet 130R are in the same orientation.

In FIG. 13, the long-side direction of the light shielding parts 131 is different between the left and right optical systems. Specifically, the long-side direction of the light shielding parts 131 of the viewing angle control sheet 130L and the long-side direction of the light shielding parts 131 of the viewing angle control sheet 130R are not parallel to each other. To be more specific, the long-side direction of the light shielding parts 131 of the viewing angle control sheet 130L and the long-side direction of the light shielding parts 131 of the viewing angle control sheet 130R are tilted in the θY direction from the Z direction, and they are bilaterally symmetric. Note that a straight line that is parallel to the Z direction and lies at the center in the left-right direction (X direction) is the axis S of symmetry. The long-side direction of the light shielding parts 131 of the viewing angle control sheet 130L and the long-side direction of the light shielding parts 131 of the viewing angle control sheet 130R, however, are not necessarily bilaterally symmetric as long as they are different directions.

In the case where the long-side direction of the light shielding parts 131 is at an angle and tilted from the Z direction, the space d1 between the adjacent light shielding parts 131 is smaller than the distance d3 between the adjacent light shielding parts 131 in the X direction. Since d1/(2×t1) is smaller than d3/(2×t1), the spread angle θ is wider in the structures shown in FIGS. 12 and 13 than in the structures shown in FIGS. 6 and 7. Thus, the space between the light shielding parts 131 and the dimension in the short-side direction are determined depending on the tilt angle of the light shielding parts 131 in the θY direction.

In any of FIGS. 12 and 13, the effect of an interference fringe is reduced. A user can thereby view a display image with high display quality. Although the structure in which the pixels are arranged in two directions orthogonal to each other is described above, this embodiment is applicable also to another pixel array such as a PenTile array. In other words, the same effect is obtained as long as the long-side direction of the light shielding parts 131 is tilted from the pixel array direction where the repetitive pitch is one pixel.

Third Embodiment

Figure 14:
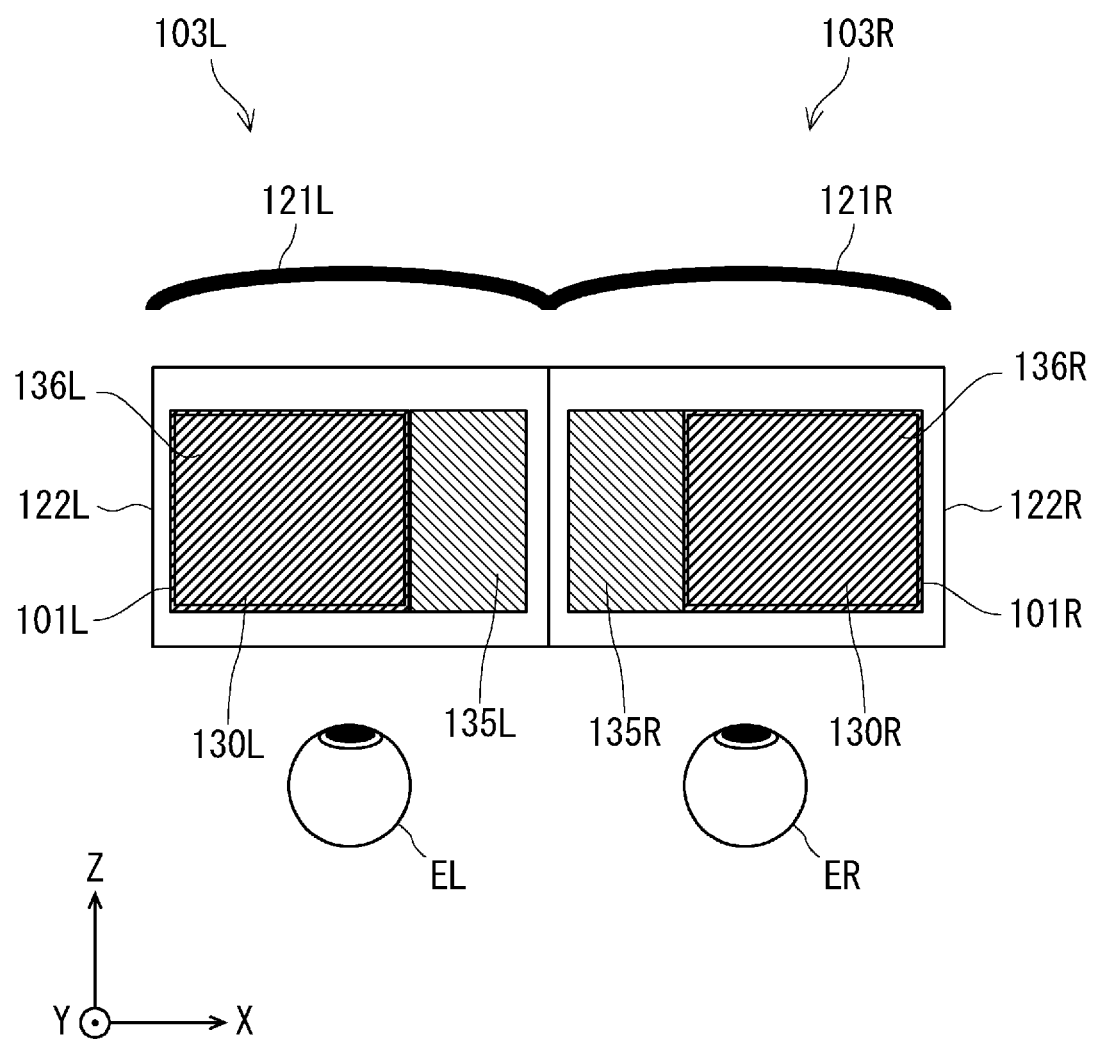
FIG. 14 is a view schematically showing the viewing angle control sheet 130L in a third embodiment.

In a third embodiment, the viewing angle control sheet 130L is placed only in a part of the left-eye display element 101L, and the viewing angle control sheet 130R is placed only in a part of the right-eye display element 101R. The structures of the left-eye display element 101L and the right-eye display element 101R in this embodiment are described hereinafter with reference to FIG. 14. Note that the basic structure of the head-mounted display 100 is the same as that in the first embodiment, and the description thereof is omitted.

A part of the area on the right side (+X side) of the left-eye display element 101L is an unrestricted area 135L. In the left-eye display element 101L, the area on the left side (−X side) of the unrestricted area 135L is a restricted area 136L. The unrestricted area 135L is an area where the display light L11 from the left-eye display element 101L cannot enter the right eye ER. The restricted area 136L is an area where part of the display light L11 from the left-eye display element 101L enters the right eye ER. The unrestricted area 135L and the restricted area 136L can be determined depending on the viewing angle characteristics of the left-eye display element 101L, the geometric structure of the left-eye optical system 103L, the curvature radius of the combiner 121L and the like.

In the unrestricted area 135L, the viewing angle control sheet 130L is not placed. Thus, the viewing angle control sheet 130L has a smaller size than the left-eye display element 101L, and it is placed only in the restricted area 136L. Specifically, the viewing angle control sheet 130L is attached to a part of the left-eye display element 101L.

Since the viewing angle control sheet 130L absorbs the display light L11 at a spread angle or wider, it reduces the amount of the display light L11 that passes through the viewing angle control sheet 130L. Thus, the amount of the display light L11 that enters the left eye EL is not the same between the restricted area 136L and the unrestricted area 135L. Therefore, in order to eliminate a difference in brightness between the restricted area 136L and the unrestricted area 135L and make the brightness uniform over the entire screen, a light reducing filter such as an ND (Neutral Density) filter may be adhered to the unrestricted area 135L.

Because of the geometric structure of the head-mounted display 100, the display light that is output from the unrestricted area 135L does not substantially become crosstalk light. For example, in the case where the combiner 121L is a concave mirror with a large curvature radius, the combiner 121L does not reflect the display light from the unrestricted area 135L in the direction of the right eye ER. In the unrestricted area 135L, crosstalk light does not occur even when the spread angle of the display light L11 is not restricted. The degradation of display quality due to crosstalk is prevented even in the case of using the viewing angle control sheet 130L only in the restricted area 136L.

A part of the area on the left side (−X side) of the right-eye display element 101R is an unrestricted area 135R. In the right-eye display element 101R, the area on the right side (+X side) of the unrestricted area 135R is a restricted area 136R. The unrestricted area 135R is an area where the display light L11 from the left-eye display element 101L cannot enter the left eye EL. The restricted area 136R is an area where part of the display light L11 from the right-eye display element 101R enters the left eye EL. The unrestricted area 135R and the restricted area 136R can be determined depending on the viewing angle characteristics of the right-eye display element 101R, the geometric structure of the right-eye optical system 103R, the curvature radius of the combiner 121R and the like.

In the unrestricted area 135R, the viewing angle control sheet 130R is not placed. Thus, the viewing angle control sheet 130R has a smaller size than the right-eye display element 101R, and it is placed only in the restricted area 136R. Specifically, the viewing angle control sheet 130R is attached to a part of the right-eye display element 101R.

Since the viewing angle control sheet 130R absorbs the display light L11 at a spread angle or wider, it reduces the amount of the display light L11 that passes through the viewing angle control sheet 130R. Thus, the amount of the display light L11 that enters the left eye EL is not equal between the restricted area 136R and the unrestricted area 135R. Therefore, in order to eliminate a difference in brightness between the restricted area 136R and the unrestricted area 135R and make the brightness uniform over the entire screen, a light reducing filter such as an ND (Neutral Density) filter may be adhered to the unrestricted area 135R.

In the viewing angle control sheet 130R also, the display light that is output from the unrestricted area 135R does not substantially become crosstalk light because of the geometric structure, just like in the left-eye optical system 103L. The degradation of display quality due to crosstalk is prevented even in the case of using the viewing angle control sheet 130R only in the restricted area 136R.

As described above, in this embodiment, the areas close to the display element on the other side are the unrestricted areas 135L and 135R in the left-eye display element 101L and the right-eye display element 101R, respectively. The viewing angle control sheets 130L and 130R are not placed in the unrestricted areas 135L and 135R, respectively. In other words, the viewing angle control sheets 130L and 130R restrict the spread angle of the display light in the restricted areas 136L and 136R excluding the unrestricted areas 135L and 135R, respectively. In the left-eye display element 101L and the right-eye display element 101R, the viewing angle control sheets 130L and 130R are placed in the areas far from the display element on the other side. In this structure also, the same effect as in the first embodiment is obtained. Further, the areas of the viewing angle control sheets 130L and 130R are reduced, which achieves the reduction of the component cost.

Figure 15:
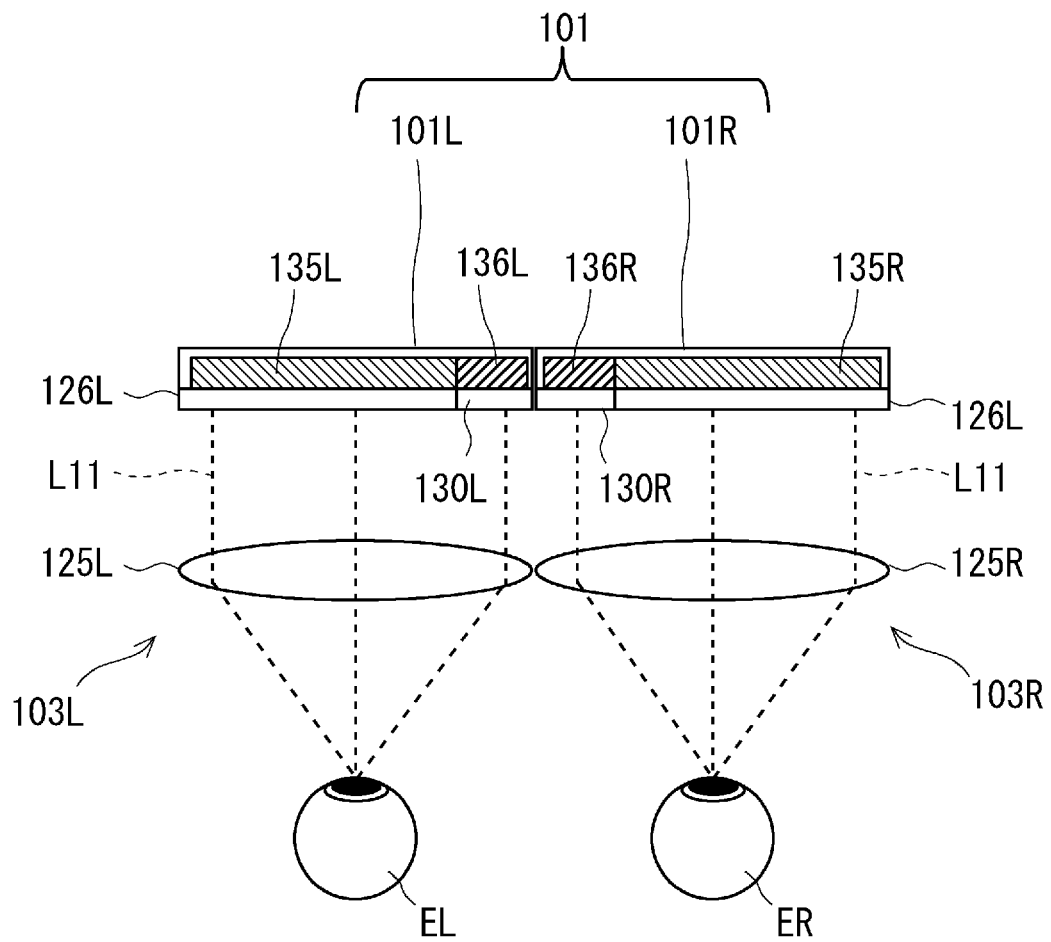
FIG. 15 is a view illustrating a restricted area and an unrestricted area in an optical system using a lens.

The unrestricted areas 135L and 135R and the restricted areas 136L and 136R in an optical system using a lens are described hereinafter with reference to FIG. 15. FIG. 15 is a top view schematically showing an optical system using a lens. The basic structure of the optical system in FIG. 15 is the same as that in FIG. 5, and the detailed description thereof is omitted.

In the optical system in FIG. 15, the unrestricted area 135L is placed on the left side (−X side) of the restricted area 136L. The unrestricted area 135R is placed on the right side (+X side) of the restricted area 136R. The viewing angle control sheets 130L and 130R are placed only in the restricted areas 136L and 136R, respectively. In the left-eye display element 101L and the right-eye display element 101R, the viewing angle control sheets 130L and 130R are respectively placed in the areas close the display element on the other side.

In this manner, the display area of the display element unit 101 is divided into the restricted areas 136L and 136R and the unrestricted areas 135L and 135R. The restricted areas 136L and 136R and the unrestricted areas 135L and 135R can be determined depending on optical elements of the optical system, the geometric structure of the optical system and the like. The viewing angle control sheets 130L and 130R are respectively placed only in the restricted areas 136L and 136R, which are parts of the display area of the display element unit 101. This reduces crosstalk.

Since the viewing angle control sheets 130L and 130R absorb the display light L11 at a spread angle or wider, they reduce the amount of the display light L11 that passes through the viewing angle control sheets 130L and 130R. Thus, the amount of the display light L11 that enters the left eye EL or the right eye ER is not equal between the restricted areas 136L and 136R and the unrestricted areas 135L and 135R. Therefore, as shown in FIG. 15, in the unrestricted areas 135L and 135R, light reducing filters 126L and 126R are adhered onto the display surfaces of the left-eye display element 101L and the right-eye display element 101R, respectively. This eliminates a difference in brightness between the restricted areas 136L and 136R and the unrestricted areas 135L and 135R and makes the brightness uniform over the entire screen.

The first to third embodiments may be combined as appropriate. For example, in the second embodiment also, the viewing angle control sheets 130L and 130R may be placed only in the restricted areas 136L and 136R, respectively.

Although the embodiments of the invention made by the present invention are described in the foregoing, the present invention is not restricted to the above-described embodiments, and various changes and modifications may be made without departing from the scope of the invention.

The present application is applicable to a head-mounted display.

What is claimed is:

1. A head-mounted display, comprising:
   a left-eye optical system configured to focus display light of a left-eye image from a display element unit on a left eye of a user wearing a head-mounted display;
   a right-eye optical system placed bilaterally symmetrically to the left-eye optical system and configured to focus display light of a right-eye image from the display element unit on a right eye of the user; and
   a viewing angle control sheet configured to restrict a spread angle of display light from the display element unit in a left-right direction,
   wherein an area where the display light from the display element unit in one of the left-eye optical system and the right-eye optical system enters an eye in another optical system is determined to be a restricted area on a basis of at least one of viewing angle characteristics of the display element unit, a geometric structure, and a curvature radius of a combiner, and
   wherein the viewing angle control sheet is fixed only to the restricted area of a display surface of the display element unit,
   wherein the viewing angle control sheet includes a plurality of light shielding parts in a form of plates,
   wherein the plurality of light shielding parts are arranged in a repetitive manner in the left-right direction, and long-side directions of the plurality of light shielding parts are parallel to one another,
   wherein the display element unit includes a plurality of pixels,
   wherein a number of pixels which a straight line extending in a given direction from a corner of one pixel among the plurality of pixels goes through until it passes through a corner of another pixel is a repetitive pitch, and
   wherein a long-side direction of each of the plurality of light shielding parts is tilted from a direction where the repetitive pitch is one pixel.

2. The head-mounted display according to claim 1, wherein
   the display element unit includes a left-eye display element for forming the left-eye image and a right-eye display element for forming the right-eye image,
   the plurality of light shielding parts are placed in each of the left-eye display element and the right-eye display element, and
   a long-side direction of the plurality of light shielding parts placed in the left-eye display element and a long-side direction of the plurality of light shielding parts placed in the right-eye display element are different directions.

\* \* \* \* \*